Patented Mar. 9, 1954

2,671,813

UNITED STATES PATENT OFFICE 2,671,813

HALOGEN SUBSTITUTED DIHYDROXY DIARYL METHANES

Paul J. Stoffel, Florissant, Mo., assignor to Monsanto Chemical Company, St. Louis, Mo., a corporation of Delaware No Drawing. Application November 2, 1951, Serial No. 254,659

6 Claims. (Cl. 260—619)

1

This invention relates to a new and novel family of dihydroxy diaryl methanes.

The new compounds may be represented by the general formula

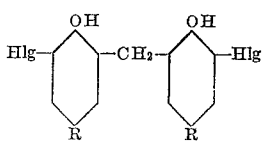

where R represents a hydrocarbon radical and Hlg represents halogen and more particularly a chloro, bromo or iodo constituent adjacent the hydroxyl group. The position of the hydrocarbon group may vary and an additional halogen substituent may be present. Examples of suitable hydrocarbon substituents comprise methyl, ethyl, propyl, butyl, amyl, hexyl, octyl, decyl, cyclohexyl, methyl cyclohexyl, benzyl and phenyl groups.

The new compounds were prepared by eliminating water of condensation by heating in the presence of an acidic condensation catalyst formaldehyde and the substituted phenol, the reaction being terminated before resinous polymers are produced. The end point of the reaction was determined by spot testing during the initial reaction. 1 ml. of the reaction mix was added to 3 ml. of a suitable precipitant and after crystal formation was noted, the reaction mixture quenched by the addition of a precipitant before resinous polymers were produced in amount sufficient to interfere with purification of the product.

As one example of the preparation of the new compounds, about 8 ml. of concentrated sulfuric acid was added dropwise to a well-stirred solution of 92.3 g. of 4-tert. butyl o-chlorophenol (0.5 mole) and 7.5 g. trioxymethylene (0.25 mole) in 50 ml. of glacial acetic acid. After the exothermic reaction subsided the mixture was heated at 95° C. for about 3 hours. Then 200 ml. of water were added and the mixture cooled to 30° C. The solids were filtered and washed with cold water until free of acidity. The crude product was taken up in 200 ml. of benzene and following decolorization with charcoal, gave fine white plates, M. P. 123.2–123.7° C., yield 51.5%. Analysis of the product gave 66.17% carbon, 6.85% hydrogen and 18.85% chlorine. The values calculated for $C_{21}H_{26}Cl_2O_2$ are 66.12% carbon, 6.87% hydrogen and 18.62% chlorine.

The new compounds possess antiseptic and germicidal properties and are also mild antioxidants. Although the invention has been illustrated by reference to a particular example, it will be appreciated that it is not limited thereto.

What is claimed is:

2

1. A compound of the structure

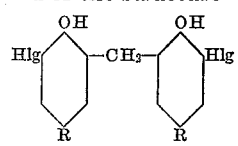

where R is a hydrocarbon group and Hlg represents halogen.

2. A compound of the structure

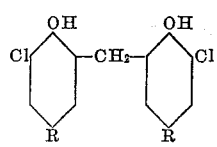

where R is a branched chain alkyl group.

3. A compound of the structure

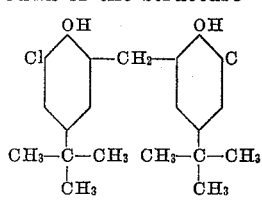

4. The method of making a dihydroxy diaryl methane which comprises eliminating water of condensation by heating in the presence of an acidic condensation catalyst formaldehyde and a 2-chloro 4-alkyl disubstituted phenol and terminating the reaction before resinous polymers are produced.

5. The method of making a dihydroxy diaryl methane which comprises eliminating water of condensation by heating in the presence of an acidic condensation catalyst formaldehyde and a 2-chloro-4-branched chain alkyl substituted phenol and terminating the reaction before resinous polymers are produced.

6. The method of making a dihydroxy diaryl methane which comprises eliminating water of condensation by heating in the presence of an acidic condensation catalyst formaldehyde and 4-tert. butyl o-chloro phenol and terminating the reaction before resinous polymers are produced.

PAUL J. STOFFEL.

References Cited in the file of this patent

UNITED STATES PATENTS

| Number | Name | Date |
|---|---|---|
| 1,707,181 | Weiler et al. | Mar. 26, 1929 |
| 2,544,826 | Craige, Jr. | Mar. 13, 1951 |

OTHER REFERENCES

Florestano, Jour. Pharmacol. Exptl. Therapy, vol. 96 (1949), pages 238–249 (12 pages). Page 241 only is relied on.